(12) United States Patent
Desai et al.

(10) Patent No.: US 6,760,390 B1
(45) Date of Patent: Jul. 6, 2004

(54) **LOG-MAP METRIC CALCULATION USING THE AVG* KERNEL**

(75) Inventors: Vipul Anil Desai, Hoffman Estates, IL (US); Brian Keith Classon, Palatine, IL (US); Thomas Keith Blankenship, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 736 days.

(21) Appl. No.: 09/696,784

(22) Filed: Oct. 25, 2000

(51) Int. Cl.$^7$ ................................................ H03D 1/00
(52) U.S. Cl. ........................................ 375/341; 375/262
(58) Field of Search ................................. 375/262, 265, 375/341

(56) References Cited

U.S. PATENT DOCUMENTS

| | | | |
|---|---|---|---|
| 5,442,627 A | | 8/1995 | Viterbi et al. .................. 370/22 |
| 6,304,996 B1 | * | 10/2001 | Van Stralen et al. ......... 714/796 |
| 6,381,728 B1 | * | 4/2002 | Kang .......................... 714/781 |
| 6,526,539 B1 | * | 2/2003 | Yano et al. .................. 714/794 |
| 6,625,778 B1 | * | 9/2003 | Nakamura et al. ........... 714/786 |
| 2002/0034269 A1 | * | 3/2002 | Demjanenko et al. ...... 375/341 |

OTHER PUBLICATIONS

L. R. Bahl, J. Cocke, F. Jelinek, and J. Raviv, "Optimal decoding of linear codes for minimizing symbol error rate," IEEE Trans. Inform. Theory, vol. IT–20, pp. 284–287, Mar. 1974.

P. Robertson, E. Villebrun, and P. Hoeher, "A comparison of optimal and sub–optimal MAP decoding algorithms operating in the log domain," International Conference on Communications, pp. 1009–1013, Jun. 1995.

W. Gross and P. Gulak, "Simplified MAP algorithm suitable for implementation of turbo decoders," Electronics Letters, vol. 34, No. 16, pp. 1577–1578, Aug. 1998.

S. Le Goff, A. Glavieux, and C. Berrou, "Turbo–codes and high spectral efficiency modulation," International Conference on Communications, Jun. 1994.

V. Kuhn, "Evaluating the performance of turbo codes and turbo–coded modulation in a DS–CDMA environment," IEEE Journal on Selected Areas of Communications, vol. 17, pp. 2138–2147, Dec. 1999.

* cited by examiner

*Primary Examiner*—Stephen Chin
(74) *Attorney, Agent, or Firm*—Kenneth A. Haas (57) ABSTRACT

The log-add kernel operation is represented as a summation of an average and a correction factor composed of a constant and a term based on a difference between the input arguments. In a described embodiment, the correction factor is approximated using the reduction of the correction factor into a Taylor series expansion, which may be defined around the difference between the input arguments as approximately zero. The approach may be further optimized to provide the Taylor series expansion as being modified to compute the correction factor with simple additions, multiplications, and shift operations. If the input arguments are close to each other, the new computed representation may be used, and if the arguments are further apart, the max operation is used. The log-add kernel operation also may be extended to more than two arguments, for application, for example, in the kernel operation of the generalized Viterbi decoder with a branch fan-in greater than 2. Additionally, a method of computing bit soft values for symbols of a higher-order modulation using log-add operations is disclosed, where each log-add is provided as an approximation including a primary term and a parameterized correction factor. Performance close to the optimal soft value generation is achieved at roughly the same complexity as the dual-min algorithm.

18 Claims, 5 Drawing Sheets

LOG-MAP METRIC CALCULATION USING THE AVG* KERNEL

FIELD OF THE INVENTION

The present invention relates to a novel operator for decoding block and convolutional codes in digital communications systems and particularly for simplifying log-MAP decoding of block and convolutional codes. The operator, the avg* representation of a kernel operation, may allow log-MAP decoding of many information services. The invention also relates to a low-complexity implementation of generating an optimal log-likelihood ratio (LLR) for use in decoders such as block and convolutional decoders.

BACKGROUND OF THE INVENTION

Block and convolutional codes, which have been advantageous in digital communications systems, are among some techniques used to transport information reliably. A variety of methods can be used to decode block and convolutional codes and to recover the information. For example, one method is a Viterbi algorithm, which is a maximum-likelihood decoding method that minimizes the probability of word error. Since a word is comprised of a sequence of symbols (or bits), the Viterbi algorithm is often called a sequence estimator. The Viterbi algorithm however does not minimize the probability of symbol (or bit) error. Another method for decoding block and convolutional codes uses a maximum aposterio (MAP) principle. MAP decoders make optimum symbol-by-symbol decisions, as well as providing "soft" reliability information which, for example, is desired in concatenated decoding systems such as turbo decoders. A possible algorithm for MAP decoding is the Bahl, Cocke, Jelink, and Rajiv (BCJR) algorithm. While the BCJR algorithm is the most commonly used MAP algorithm, the BCJR algorithm however suffers several shortcomings that make it difficult for hardware and software implementations, e.g., the requirement for multiplications and exponentiations.

In general, a MAP decoder requires forward and backward generalized Viterbi recursions on the code trellis, requiring sums of products of probabilities. A MAP decoder also computes likelihood ratios that are based on the results of the forward and backward recursions. The log-MAP algorithm couches the MAP decoder in the logarithmic domain, eliminating exponentiations and turning the products into sums, but also turning the sums into operations of a complicated function (i.e., log-add). This complicated function is the kernel operation of the log-MAP decoder that dominates the overall decoder complexity, similar to the add-compare-select (ACS) operation in a conventional Viterbi decoder. In the art, the complicated function has been represented as the max* function, a maximization (max) operation plus a correction term. One common implementation method for the max* function computes the max and adds a correction term which is accessed from a lookup table. Although this method appears to be efficient, the table lookup may be too complex to implement in both software and hardware. For example, table lookups may cause pipeline stalls within processors. One sub-optimal implementation, known as a max-log-MAP function, omits the correction term (i.e., max instead of max*).

One class of block and convolutional codes is a turbo code, which is, for example, being proposed for third generation (3G) cellular services. The decoders for turbo codes (turbo decoders) can be difficult to implement because they are complex and because the decoder is iterative. For instance, complexity estimates for turbo decoding 3G services can prohibit optimal (MAP or log-MAP) decoding of the constituent codes that comprise a turbo code. Although a sub-optimal algorithm such as the max-log-MAP or Soft Output Viterbi Algorithm (SOVA) may be used to meet the complexity constraints, either the decoder performance suffers from not using the optimal algorithm or number of iterations required to meet a specified performance increases. Therefore, there is a need for an algorithm that allows computationally efficient log-MAP decoding.

Many current (EDGE, iDEN) and most future (1XTREME, HDR, 4G) communication systems are employing higher-order modulations (8PSK, 16QAM, 64QAM, etc) in order to improve system spectral efficiency. Soft-decision decoding in these systems is complicated by the need for soft values for each encoded bit, rather than each symbol. Soft-decision decoding is necessary because of improved reliability to voice and data (up to 2 dB) and it facilitates advanced decoding techniques such as turbo codes and hybrid ARQ. The optimal soft value for bit k of a received symbol y, for any set of possible modulated (transmitted) symbols X, is:

$$\ln\left(\frac{p(y\mid x, x \in X_0)}{p(y\mid x, x \in X_1)}\right) = \ln\left(\frac{\sum_{X_0} p(y\mid x)}{\sum_{X_1} p(y\mid x)}\right), \quad (1)$$

where x is a modulated symbol, $X_{i=\{x\mid x_k=i\}}$, and $x_k$ is the corresponding $k^{th}$ bit of the modulated symbol index for x, and all symbols are equally probable. Because equation (1) is complex to implement, sub-optimal methods of generating soft values are employed. The current method of generating soft values is the dual-min, $$K\left(\min_{X_1} d_1^2 - \min_{X_0} d_0^2\right),$$

where K is a scale factor proportional to the signal-to-noise ratio (SNR), $X_1$ is the set of constellation points with a "1" in the desired bit position, and $X_0$ is the set of constellation points with a "0" in the desired bit position. The term $d_1^2$ ($d_0^2$) is the squared Euclidean distance from the received symbol to the constellation symbol with a 1 (0) in the desired position. The dual-min essentially compares the received symbol to all possible transmitted symbols, and assigns a soft value based only on the closest symbol with a 0 and the closest symbol with a 1 in that bit position. The dual-min is much easier to implement than the optimal method, but it unfortunately suffers a performance degradation from the optimal method.

Thus, there is also a need for a low-complexity, high-performance method of generating bit soft values from higher-order modulation symbols.

BRIEF DESCRIPTION OF THE DRAWINGS

The novel features believed characteristic of the invention are set forth in the appended claims. The invention itself, however, as well as the preferred mode of use, further objectives and advantages thereof, is best understood by reference to the following detailed description of the embodiments in conjunction with the accompanying drawings, wherein:

DETAILED DESCRIPTION OF PREFERRED EMBODIMENTS

Reference will now be made in detail to the present embodiments of the invention. Optimal decoding of high data rate services can exceed complexity constraints of many hardware and software implementations. For example, current complexity estimates for turbo decoding high data rate 3G services prohibit optimal decoding of the constituent codes within turbo codes. While sub-optimal algorithms such as the max-log-MAP or SOVA may be used to meet the complexity constraints, performance suffers due to the inability to use optimal algorithms. A novel avg* representation is proposed for the log-add kernel operation of the log-MAP decoder to simplify decoding, and to allow log-MAP decoding of many high data rate services. The avg* function provides a low complexity alternative to the max* kernel operation.

In accordance with one embodiment, the log-add kernel is computed using an average "(x+y)/2" plus correction factors instead of the max plus correction terms. The correction factor is comprised of a constant and a transcendental function. The transcendental function can be accurately represented with the first few terms of its Taylor series expansion. Preferably, the Taylor expansion may be modified such that the transcendental function can be computed with simple additions, multiplications, and shift operations.

Further simplification may be possible by using (combining) different representations of the complicated log-add operation based on its input arguments. If the arguments are close to each other, the new representation (the avg* function) can be used, and if the arguments are further apart, the max operation can be used. This strategy greatly reduces the average computational burden.

The log-add kernel operation may be extended to more than two arguments, for application, for example, to the final log likelihood ratio (LLR) computation in the log-MAP algorithm, as well as, for example, the kernel operation of the generalized Viterbi decoder with a branch fan-in greater than 2. The log-add kernel operation with several variations may be extended to generating soft values for higher-order modulation.

Briefly, the described embodiments provide a maximum a posteriori (MAP) decoding method and system in which a code graph is generated and used. For example, block and convolutional codes can be implemented on a code graph, or more specifically a code trellis. A code graph, which is a generalization of a code trellis, allows LLR computation to be included for describing decoding methods. In one implementation, a MAP decoder can utilize the graph structure for making the symbol-by-symbol decisions. In this implementation, a MAP decoder examines the probability p(s', s, y) of transitioning from state s' to state s during the $k^{th}$ section of the graph, given an entire received sequence y. Because of the underlying Markov nature of the code, this probability can be broken up into a product of three probabilities: the past $\alpha_k(s')=p(s', y_{j<k})$ present $\gamma_k(s', s)=p(s, y_k|s')$, and future $\beta_k(s)=p(y_{j>k}|s)$. The notation "$y_{j<k}$" refers to the sequence of symbols that precedes the $k^{th}$ symbol of y. The alpha and beta probabilities are calculated through forward and backward generalized Viterbi recursions on the code graph, each of which also involves sums of products of probabilities. Likelihood ratios are also computed from the three probabilities. Implementing the MAP algorithm in the log domain (i.e., log-MAP algorithm) converts the products into sums but transforms the additions into a complicated log-add function, i.e., $$f(x,y)=\ln(e^x+e^y) \quad (2)$$

The function (2) is the kernel operation of the log-MAP decoder that dominates the overall decoder complexity, similar to the add-compare-select (ACS) in conventional Viterbi decoding. The function (2) is one example of computing a logarithm of a sum of a plurality of exponentiated input arguments. Function (2) illustrates an example for two input arguments, x and y. Table 1 lists some of the properties of the log-add function.

TABLE 1

Properties of the log-add function f(), where x, y, and z are variables while c is an arbitrary constant

| Property | |
|---|---|
| Additive identity | $f(x,-\infty) = x$ |
| Commutative | $f(x,y) = f(y,x)$ |
| Associative | $f(f(x,y),z) = f(x,f(y,z))$ |
| Compositions | $f(f(x,y),z) = f(x,y,z)$ |
| Addition of constants | $f(x+c, y+c) = f(x,y) + c$ |
| Compositions and constants | if $g(x,y) = f(x,y) + c$, $g(x,y,z,-\infty) = g(g(x,y),g(z,-\infty)) = f(x,y,z) + 2c$, but $g(x,y,z) \neq f(x,y,z) + 2c$ |

Previously, equation (2) is represented as the max* operation, as follows:

$$\ln(e^x+e^y)=\max(x,y)+\ln(1+e^{-|x-y|}) =\max(x,y)+f(|x-y|) =\max^*(x,y) \quad (3)$$

For example, equation (3) is a max operation plus a correction term based on an absolute difference of the arguments x and y. The max term in equation (3) is defined as a primary term. The sub-optimal log-MAP with the correction term omitted (i.e., max instead of max*) is known as the max-log-MAP.

Figure 1:
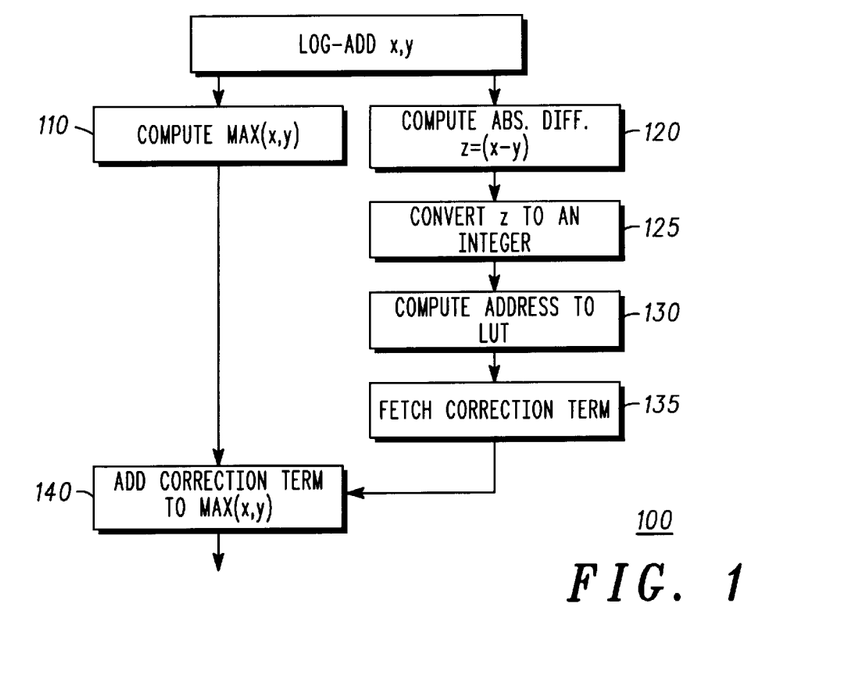
FIG. 1 is a flowchart for implementing the max* kernel using a lookup table.

Although the correction term in equation (3) may, for example, be implemented as a table lookup, employing tables is not practical for high data rate services. For instance in some processors, the overhead, which includes the operations of computing the index for the table, loading address registers, and pipeline stalls resulting from memory fetches, limit the sustainable data rate. FIG. 1 illustrates a flowchart for implementing the max* algorithm. Note that finding the max is simple but the overhead for the correction term is quite high.

Another method of expressing equation (2) is to represent the sum as $$\ln(e^x + e^y) = \ln(e^{(x+y)/2}(e^{(x-y)/2} + e^{-(x-y)/2})) \quad (4)$$

$$= \ln(e^{(x+y)/2}) + \ln\left\{2\left(\frac{e^{(x-y)/2} + e^{-(x-y)/2}}{2}\right)\right\}$$

$$= \frac{x+y}{2} + \ln 2 + \ln\left(\frac{e^{(x-y)/2} + e^{-(x-y)/2}}{2}\right)$$

$$= \frac{x+y}{2} + \ln 2 + \ln\left(\cosh\left[\frac{x-y}{2}\right]\right)$$

$$= avg(x, y) + f(|x-y|)$$

$$= avg^*(x, y)$$

Equation (4) implements an average (avg) plus a correction factor comprised of a constant and a transcendental function based on a difference. In equation (4), the avg term is the primary term. While the transcendental function $\ln(\cos h(x-y)/2)$ seems complicated, an accurate Taylor series expansion around $z \equiv (x-y)/2=0$ $$\ln(\cosh(z)) \approx \frac{1}{2}z^2 - \frac{1}{12}z^4 + \frac{1}{45}z^6 + \ldots \quad (5)$$

only requires a finite number of terms. Note since cos h(z) is an even and positive function, absolute values are not necessary. The expansion of $f(z)=\ln(\cos h(z))$ requires the derivatives $$f^{(1)}(z) = \tanh(z) \Rightarrow f^{(1)}(0) = 0$$

$$f^{(2)}(z) = \operatorname{sech}^2(z) \Rightarrow f^{(2)}(0) = 1$$

$$f^{(3)}(z) = -2\operatorname{sech}^2(z)\tanh(z) \Rightarrow f^{(3)}(0) = 0$$

$$f^{(4)}(z) = 4\operatorname{sech}^2(z)\tanh^2(z) - 2\operatorname{sech}^4(z) \Rightarrow f^{(4)}(0) = -2$$

$$f^{(5)}(z) = 16\operatorname{sech}^4(z)\tanh(z) - 8\operatorname{sech}^2(z)\tanh^2(z) \Rightarrow f^{(5)}(0) = 0$$

$$f^{(6)}(z) = 16\operatorname{sech}^2(z) - 88\operatorname{sech}^4(z)\tanh^2(z) + 16\operatorname{sech}^2(z)\tanh^4(z) \Rightarrow f^{(6)}(0) = 16$$

The resulting expansion, a sixth order correction factor, has three terms and is $$f(z)|_{z=0} = f(0) + f^{(1)}(0)z + \frac{f^{(2)}(0)}{2!}z^2 + \frac{f^{(3)}(0)}{3!}z^3 + \frac{f^{(4)}(0)}{4!}z^4 +$$

$$\frac{f^{(5)}(0)}{5!}z^5 + \frac{f^{(6)}(0)}{6!}z^6 +$$

$$\approx \frac{1}{2}z^2 - \frac{1}{12}z^4 + \frac{1}{45}z^6$$

A Taylor series can be expanded around any value. For the function $f(z)=\ln(\cos h(z))$, an advantageous expansion occurs when $z=0$ because many terms evaluate to zero.

The constant within equation (4) may be omitted under certain conditions and will be shown later. However, for illustration purposes, the constant shall be kept. The Taylor expansion can be modified such that the correction factor can be computed with simple additions, multiplications, and shift operations.

$$\ln(e^x + e^y) \approx \frac{x+y}{2} + \ln 2 + \frac{1}{2}\left(\frac{x-y}{2}\right)^2 - \frac{1}{16}\left(\frac{x-y}{2}\right)^4 \quad (6)$$

In equation (6), the Taylor series expansion is represented by two terms. Note that factors of two, such as $\frac{1}{16}$, can be implemented with shifts, such as right shifts. In many cases, only a single term of the expansion may be necessary, resulting in $$\ln(e^x + e^y) \approx \frac{x+y}{2} + \ln 2 + \frac{1}{2}\left(\frac{x-y}{2}\right)^2 \quad (7)$$

Figure 2:
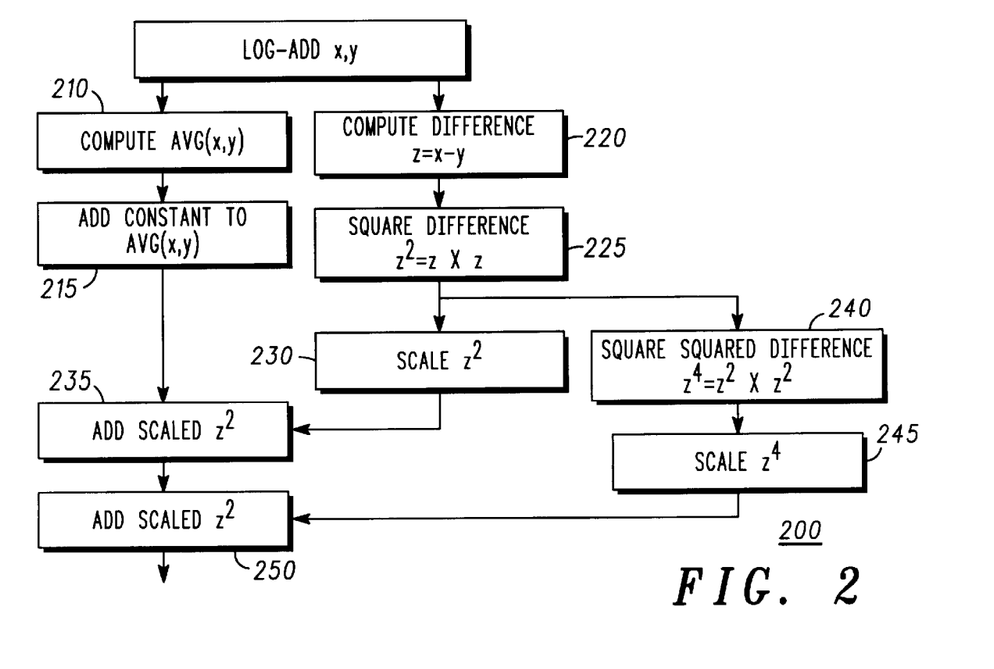
FIG. 2 is a flowchart for implementing the avg* kernel using a fourth-order correction factor.

Finally, for a minimal complexity implementation, the quadratic term can be dropped altogether (i.e., the Taylor series expansion is represented by zero terms) leaving only the average plus a constant FIG. 2, which is a flowchart for implementing equation (6), illustrates that the new representation does reduce the implementation cost over the table lookup approach. Although there are more processing blocks in FIG. 2 when compared to FIG. 1, there is the ability to operate the blocks in parallel. This ability allows the avg* kernel representation to execute faster and potentially allows the steps to be combined. For example in information processors such as digital signal processors (DSPs), multiplication and addition can occur concurrently. Furthermore, the complexity reduction does not include some efficiencies gained by pipelining and algorithm simplification.

Figure 3:
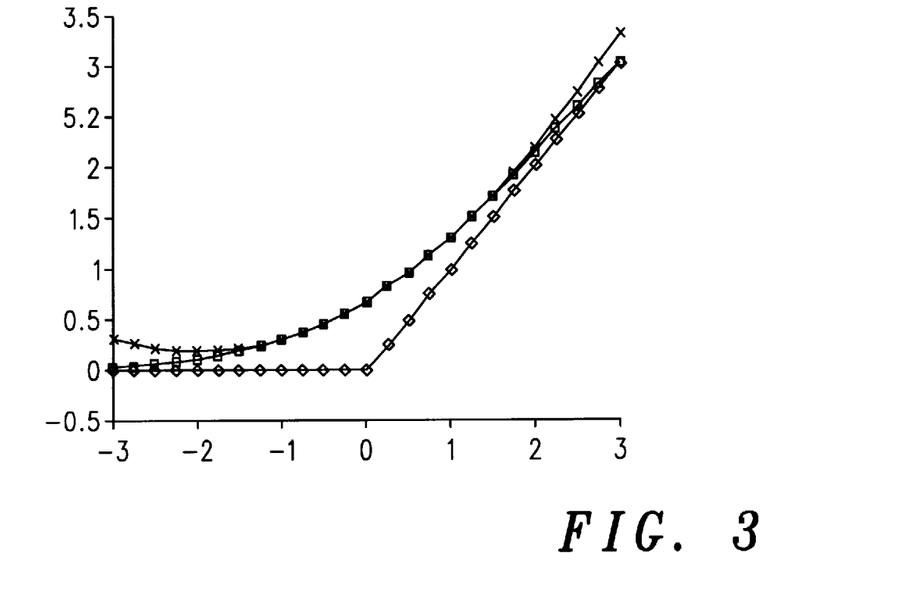
FIG 3. graphically illustrates the accuracy of various approximations to the optimal log-add function $\ln(e^x+e^y)$.

The accuracy of the approximations given by equations (6) and (7) compared to max(x, y) and $\ln(e^x+e^y)$ is shown in FIG. 3. The approximations are tightest around the point where the max operation in the max-log-MAP performs the worst. However for large $|x-y|$, the max operation is preferred because the sum in equation (2) degenerates into the max operation.

Figure 4:
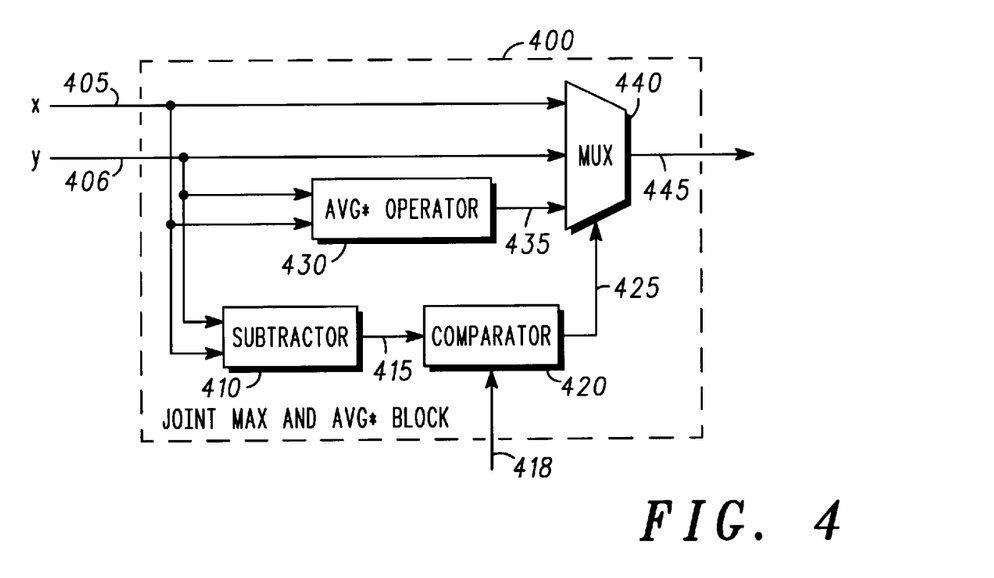
FIG. 4 shows an advantageous combination of the avg* kernel and the max operation.

An alternate preferred embodiment combines the avg* and the max operation, as shown in FIG. 4. For example, when $|x-y|$ is less than a threshold T parameter, equation (6), equation (7), avg(x,y) with a constant, or avg(x,y) can be used, and for large $|x-y|$ (above T) the max operation is used, as shown in equation (8).

$$\ln(e^x + e^y) = \begin{cases} x & x-y > T \\ y & y-x > T \\ \left(\frac{x+y}{2}\right) + f(|x-y|) & \text{else} \end{cases} \quad (8)$$

Equation (8) is preferably implemented with the correction factor being a constant, such as ln 2. This alternate preferred embodiment has the advantage of close approximation to the true log-add kernel, and the advantage of reduced computation burden since the terms of equation (8) can be produced via a parallel circuit or instructions.

Another application besides the two-argument $\ln(e^x+e^y)$ kernel operation is a multi-argument version that appears in the final log-likelihood ratio (LLR) calculation for each decoded bit. For example, the 8-state code in the 3GPP standard uses an n=8-argument function $y_n=\ln(e^{x_1}+\ldots+e^{x_n})$. In this example, $y_n=\ln(e^{x_1}+\ldots+e^{x_n})$ is a logarithm of a sum of a plurality (i.e., 8) of exponentiated input arguments, $x_1, \ldots, x_8$. The 8-argument function can be computed sequentially with $$y_2=\ln(e^{x_1}+e^{x_2}) y_{n-1}=\ln(e^{y_{n-2}}+e^{x_{n-1}}) y_n=\ln(e^{y_{n-1}}+e^{x_n}) \qquad (9)$$

Since equation (9) can be used with any representation of the two-argument function, the two-argument avg* can be applied to the final log likelihood ratio computation in the log-MAP algorithm as well as the kernel operation of the generalized Viterbi decoder. However, since $y_n=\ln(e^{x_1}+\ldots+e^{x_n})$ can be expressed as $$\begin{aligned} y_n &= \ln\left(\sum_{i=1}^n e^{x_i}\right) \\ &= \frac{1}{n}\sum_{i=1}^n x_i + \ln\left(\sum_{i=1}^n \exp\left(x_i - \frac{1}{n}\sum_{j=1}^n x_j\right)\right) \\ &= avg(x_1, \ldots, x_n) + \ln\left(\sum_{i=1}^n \exp(x_i - avg(x_1, \ldots, x_n))\right) \\ &= avg^*(x_1, \ldots, x_n) \end{aligned} \qquad (10)$$

an average plus a correction factor, the avg* is also generalized to n arguments. The n-argument avg* is attractive because summing values is extremely simple to implement in hardware or software, much easier than finding pairwise or n-wise maxima. Furthermore, the division by n can be avoided since the result is used in a likelihood ratio.

Figure 5:
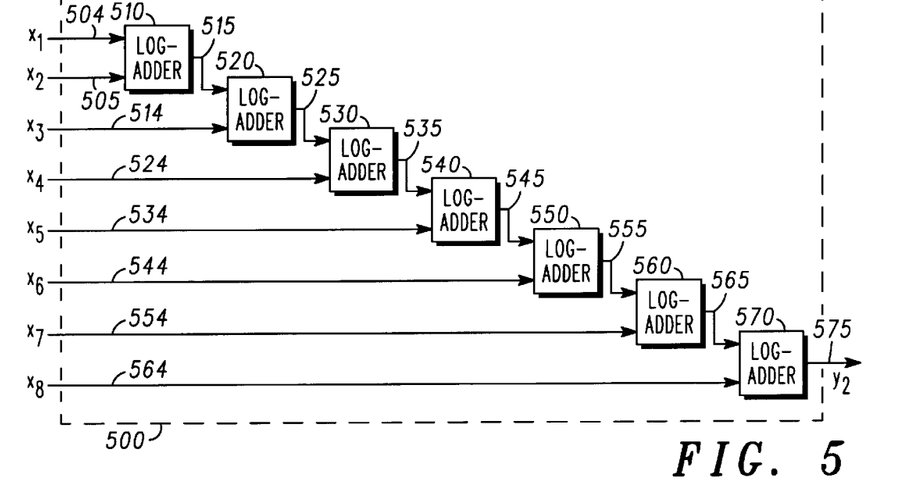
FIG. 5 shows a sequential computation of an 8-input log-add.
Figure 6:
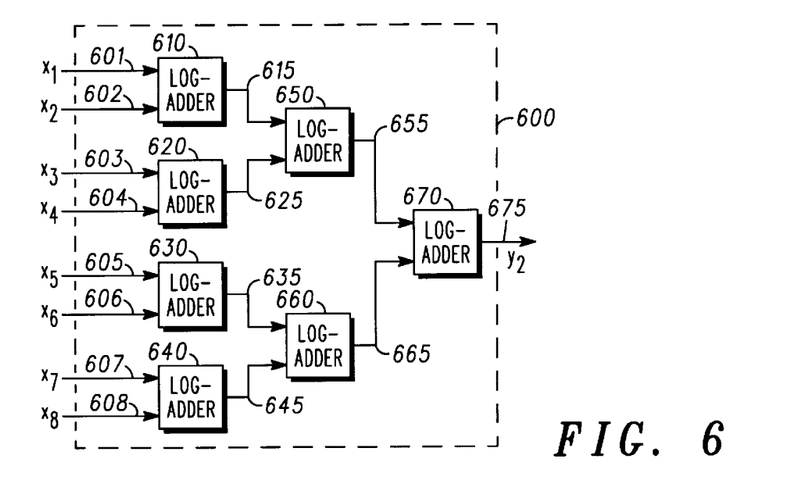
FIG. 6 shows a tree-like representation of an 8-input log-add.

Table 1 indicates that the two-argument log-add function (and hence the avg* function) is invariant to the addition of constants. This property suggests that the ln 2 term within the avg* function can be disregarded (the preferred embodiment but not in the alternate preferred embodiment) when performing a pairwise log-add. Furthermore, the property suggests that any constant can be added (or subtracted) without changing the log-add. However, for an n-argument log-add (n>2), the method how arguments are added affects how constants are treated. For example, there are several methods of computing the 8-argument function for the 8-state code in the 3GPP standard. FIG. 5 and FIG. 6 describe two of the methods; many other permutations for adding n arguments are possible, but are equivalent due to the associative and commutative properties listed in Table 1. FIG. 6 suggests that a tree-like representation to implement an n-argument log-add provides a flexibility of eliminating constants, such as ln 2. Since the tree-like representation itself can apply to any kernel operation (not just the avg*) within a log-MAP decoder, it provides a low complexity approach for implementing a log-MAP decoder. However, it is more advantageous for kernel operations having constants, such as the avg*. Although the tree-like representation may require a little more memory for storing intermediate results, the increase is minor when examining the overall memory needed for a decoder.

The avg* representation of the kernel operation of the log-MAP decoder simplifies log-MAP decoding by avoiding table lookups. The simplification to the kernel operation of the log-MAP decoder can allow cellular 3G products to implement an "optimal" log-MAP decoder within software and hardware for many 3G services. Products using the optimal log-MAP decoder, examples include turbo decoders, will have better performance for a given number of iterations, or require a smaller number of iterations for a performance target Although the technique was developed for processors, the avg* representation can also be used to improve future hardware log-MAP decoders or accelerators.

The log-add kernel is also present in generating soft values for higher-order modulations. In modulation, a group of bits is mapped into a symbol. At the receiver, the reciprocal operation occurs where a symbol is mapped into soft values. In general, an accurate soft value can improve decoder performance. When more than two bits are mapped into a symbol, generating accurate soft values in a receiver can be difficult. Examples of mapping more than two bits per symbol include 8-PSK (phase shift keying), 16-QAM (quadrature amplitude modulation), 64-QAM, and 256-QAM. The optimal method of generating soft values, shown in equation (1), is comprised of transcendental functions that are impracticable to implement However, given a two-dimensional signal set and independent $N(0\sigma^2)$ noise (the noise is Gaussian with a probability density function characterized by $N(0\sigma^2)$(zero mean, variance a $\sigma^2$)) in each dimension, the optimal soft value generation method can be represented as $$\ln\left(\frac{\sum_{X_0}\exp\left(-\frac{d_0^2}{2\sigma^2}\right)}{\sum_{X_1}\exp\left(-\frac{d_1^2}{2\sigma^2}\right)}\right) = K\left(\ln\sum_{X_0}\exp(-d_0^2) - \ln\sum_{X_1}\exp(-d_1^2)\right), \qquad (11)$$

where $K=1/2^2$ is a scale factor proportional to a signal-to-noise ratio (SNR), $X_1$ is the set of constellation points with a "1" in the desired bit position, and $X_0$ is the set of constellation points with a "1" in the desired bit position. The term $d_1^2$ ($d_0^2$) is a distance measure, such as the squared Euclidean distance, from the received symbol to the constellation symbol with a 1 (0) in the desired bit position. In general, equation (11) uses a log-add, a logarithm of a sum of a plurality of exponentiated input arguments with the input arguments being $-d_0^2$ ($-d_0^2$). Since the log-add function can be difficult to implement, it is approximated. One approximation, which is equivalent in performance to the dual-min algorithm, is where the transcendental functions (ln and exp) are replaced with minimums. While this approximation simplifies implementation, it causes some degradation in decoder performance. The log-add of a plurality of input arguments can arise from dealing with probability density functions with exponents or logarithms. The log-add can also arise when simplification of arithmetic processing is needed, such as the case of log-MAP decoders.

Another method of approximating the log-add function $\ln(e^x+e^y)$ is the max*, shown in equation (3). In the max* approximation, the primary operation is a maximum (max) operator and a correction term, $\ln(1+e^{-|x-y|})$, can be accessed from a table lookup. While a table lookup appears simple, it can be difficult to implement. Hence, the max* is unattractive for implementation.

Other methods exist which do not employ a table lookup. One method is a linear-log-MAP, $$\ln(e^x+e^y)\approx\max(x,y)+S\max(T-|x-y|,0) \qquad (12)$$

where the primary operation is a max and the parameterized correction factor is Smax $(T-|x-y|,0)$. The parameter S represents a slope while the parameter T is a threshold. The term "parameterized correction factor" refers to a correction factor that has definable terms, such as scalars (e.g., S), thresholds, and constants.

A constant-log-MAP method, given by $$\ln(e^x + e^y) \approx \max(x, y) + \begin{cases} 0, & |x-y| > T \\ C, & |x-y| \leq T \end{cases} \quad (13)$$

also has the max for its primary operation but the parameterized correction factor includes a constant C and a threshold T. One possible procedure for determining the parameters in equations (12) and (13) is to employ the methods for log-MAP decoding of the constituent codes within a turbo decoder. Subsequently, the parameters can then be selected once the turbo decoder performance is optimized. For example, C=0.375 and T=2.0 optimize performance for a turbo decoder.

Another method is the avg* approximation, which is shown in equation (4). The correction factor in the avg* approximation can be implemented in a variety of ways, including equation (6). Note that in equation (6), the correction factor is not parameterized. A preferred embodiment combines the avg* with the max operation, yielding $$\ln(e^x + e^y) \approx \begin{cases} x & x-y > T \\ y & y-x > T \\ \frac{(x+y)}{2} + C & \text{else} \end{cases} \quad (14)$$

In this preferred embodiment, the parameterized correction factor for the avg* method, which is comprised of a parameter T and a constant C, can be optimized for turbo decoding. However, because C and T were optimized for turbo decoding, those parameters may not be optimal for soft value generation.

In another embodiment, the log-add function can have two or more sets of parameters. For example, one set of parameters can be used for generating soft values while another set of parameters can be used for decoding, such as turbo decoding and log-MAP decoding. For instance, equation (14) defines an avg* operation for generating soft values while equation (8) defines an avg* operation for log-MAP decoding. The parameters in equation (14) can be different from the parameters in equation (8).

Figure 7:
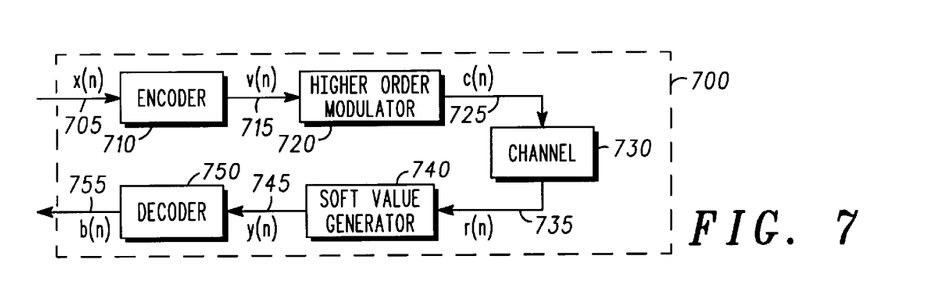
FIG. 7 shows a block diagram of a communication system including bit soft value generation and higher-order modulation.
Figure 8:
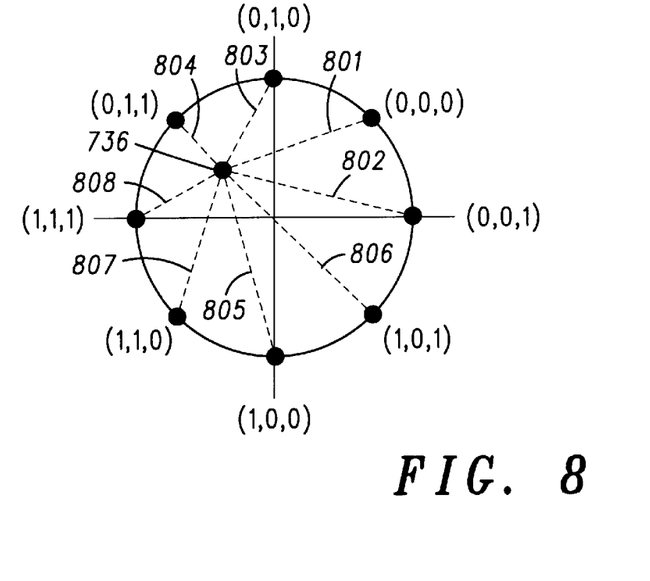
FIG. 8 shows an example of a higher-order 8-PSK constellation and a received symbol point.

The application of soft value generation to higher-order modulation is shown in FIG. 7. FIG. 8 shows an example of a higher-order 8-PSK constellation and a received symbol point Because higher-order modulation has more than four constellation points, equation (11) requires the use of multi-input log-add functions. An n-input log-add $y_n = \ln(e^{x_1} + \ldots e^{x_n})$ can be computed recursively using equation (9) or with a tree-like representation. The recursive formulation can be used with any of the methods, such as the constant-log-MAP, the linear-log-MAP, the max*, or the avg*. The avg* method has a particularly attractive form, however, since $$y_n = \ln\left(\sum_{i=1}^{n} e^{x_i}\right) \quad (15)$$

$$= \frac{1}{n}\sum_{i=1}^{n} x_i + \ln\left(\sum_{i=1}^{n} \exp\left(x_i - \frac{1}{n}\sum_{j=1}^{n} x_j\right)\right)$$

$$= avg(x_1, \ldots, x_n) + \ln\left(\sum_{i=1}^{n} \exp(x_i - avg(x_1, \ldots, x_n))\right)$$

$$= avg^*(x_1, \ldots, x_n)$$

Figure 9:
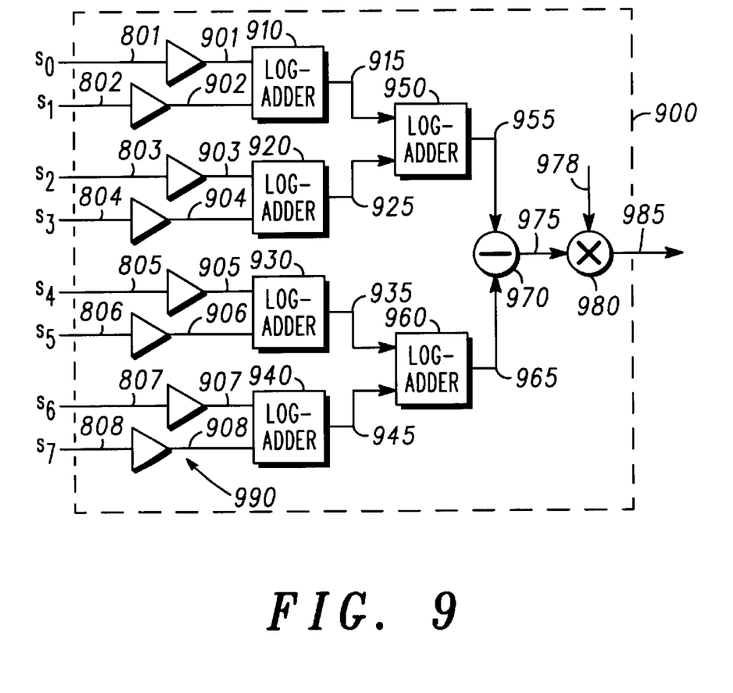
FIG. 9 shows the soft value generation for the example in FIG. 8 using two input log-add functions developed for turbo decoding applications.

Equation (15) extends the two-input avg* method to a multi-input function. In general, the multi-input log-add due to generating soft values for higher-order modulation can be computed advantageously using a tree-like representation. FIG. 9 shows the soft value generation for the example in FIG. 8 using a tree-like representation of two-input log-add functions. The log add functions in a tree-like representation are defined as "nodes." In the example in FIG. 9, the nodes have two inputs.

Figure 10:
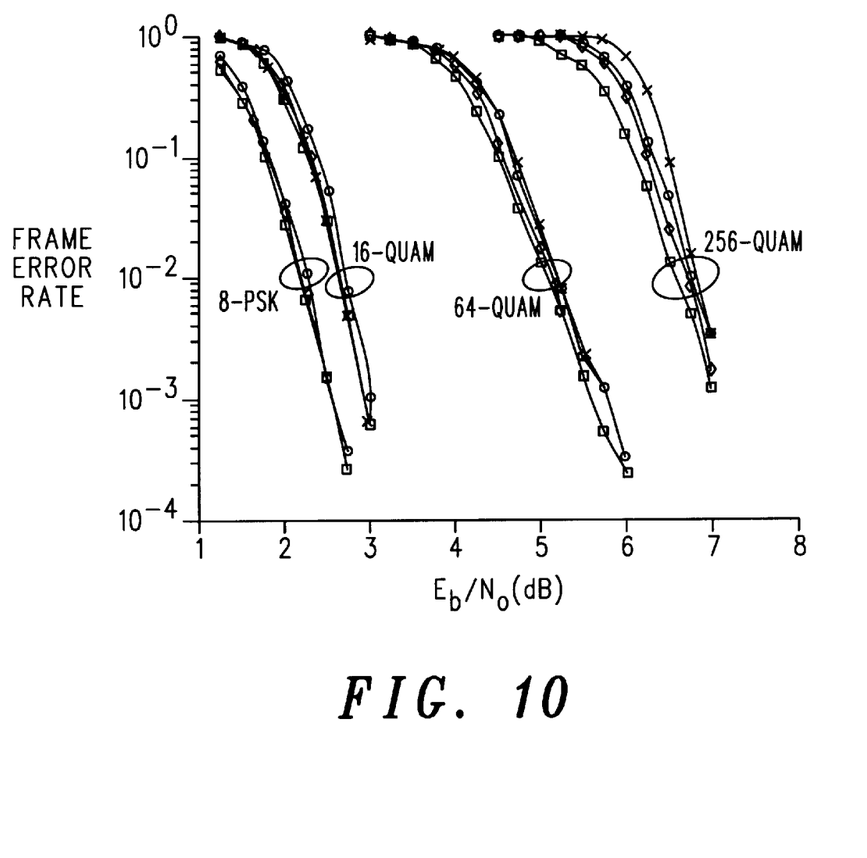
FIG. 10 shows the performance in decoded frame error rate (FER) for the present invention using the avg* method and constant-log-MAP method compared to the optimal soft value generation and the dual-min prior art for 8-PSK, 16-QAM, 64-QAM, and 256QAM.

FIG. 10 shows the performance in decoded frame error rate (FER) for the present invention in AWGN using the avg* method (equation (14) with C=ln 2 and T=2 ×ln 2) and constant-log-MAP method compared to the optimal soft value generation and the dual-min prior art for 8-PSK, 16-QAM, 64-QAM, and 256-QAM. The results indicate that using a low-complexity log-add kernel developed for turbo decoding but optimized for soft value generation can offer up to 0.25 dB or more improvement in an AWGN channel over the prior art dual-min algorithm. The results also indicate that the application of the constant-log-MAP with parameters optimized for turbo decoding does not perform as well as it did for log-MAP turbo decoding. Because these low-complexity methods which use a primary term and parameterized correction factor are implemented without a table lookup, the overall complexity is roughly the same as the dual-min algorithm.

FIG. 1, numeral 100, depicts a flowchart for implementing a max* kernel with a lookup table for adding variables (arguments) x and y. Module 110 computes a maximum between the variables x and y. Module 120, which in some implementations can occur parallel with Module 110, computes z, an absolute difference between the variables x and y. Module 125, which may be necessary for certain arithmetic representations, converts the absolute difference z into an integer. For example, the conversion in Module 125 can be a simple scaling. Module 130 computes an address for a lookup table using the integer. For instance, in processors, Module 130 can represent a pointer operation. Once the address is computed, Module 135 fetches a correction term from memory. Some examples of memory can be read-only memory (ROM) and forms of random access memory (RAM). Module 140 adds the correction term to the maximum of x and y. The flowchart illustrates that computing a max* with a lookup table can be difficult to implement because there are limited opportunities for parallelism.

FIG. 2, numeral 200, depicts a flowchart for implementing an avg* kernel for adding variables x and y. The flowchart illustrates an example for a fourth-order correction factor, such as the factor in equation (6). Extending the flowchart to a larger order correction factor can be performed easily. Also reducing the number of terms (lower order correction factor) can be accomplished by eliminating several modules. Furthermore, the sequence of modules may be reordered for reasons such as numerical accuracy and pipelining. FIG. 2 provides an example of one implementation. Module 210 computes an average of variables (arguments) x and y. Module 215 provides a capability of adding a constant, such as ln 2, to the average. When the constant is zero, Module 215 can be removed. Module 220, which in some implementations can occur parallel with Module 210, computes z, a difference between the variables x and y. Module 225, squares the difference z to produce $z^2$. Module 230 scales the squared difference $z^2$ while Module 235 adds the scaled squared difference. In some implementations, the scaling may be performed with shifts. For some implementations information processors such as in DSPs, the scaling and addition within Modules 230 and 235, respectively, may be combined because DSPs can multiply and accumulate in one operation. Module 240 computes the square of $z^2$ (i.e., $z^4$) while Module 245 scales $z^4$. Module 250 adds the scaled $z^4$ term to produce the avg* with a fourth order correction factor. In some implementations, the scaling within Module 245 may be performed with shifts. Similarly, the scaling and addition within Modules 245 and 250, respectively, may be combined because some implementations can multiply and accumulate concurrently. The flowchart illustrates that computing the avg* kernel provides several opportunities for parallelism. As a result, the kernel can meet timing constraints while maintaining accuracy and lowering complexity.

FIG. 3 is a graphical comparison of a log-add operation, the max operation, equation (6), and equation (7) for conditions of $-3 \leq x \leq 3$ and y=0. The condition is also equivalent to $-3 \leq x-y \leq 3$. FIG. 3 illustrates that the max operation deviates the largest from the log-add curve when the absolute difference $|x-y| \approx 0$ but approaches the log-add curve for a large absolute difference. The approximation given by equation (6) closely follows the log-add curve. However, the approximation given by equation (7) starts to deviate from the log-add curve as the absolute difference increases.

FIG. 4, numeral 400, provides an example for the second preferred embodiment represented by equation (8). A joint max and avg* block 400 operates on input arguments x 405 and y 406 to produce a log-add sum w 445. A subtractor 410 is responsive to the input arguments x 405 and y 406 and computes a difference 415. A comparator 420 is responsive to the difference 415 and a threshold T 418 to produce a signal 425 indicating the relationship of the difference 415 and the threshold T 418. An avg* operator 430 is responsive to the input arguments x 405 and y 406 and computes a sum 435 using the avg* operation. In one example, the avg* operation can be computed using the flowchart in FIG. 2. In another example, the avg* operation can be computed using an average plus a constant A mux 440 is responsive to the input arguments x 405 and y 406, the sum 435, and the signal 425. The mux 440 uses signal 425 to select one of the three inputs, input argument x 405, input argument y 406, and the sum 435, as the log-add sum w 445.

FIG. 5, numeral 500, provides an example diagram for a sequential log-add addition of 8 input arguments (signals). The associative and commutative properties of the log-add function listed in Table 1 suggest that a large number of log-add permutations exist among the input signals x and the intermediate results $y_1$. FIG. 5 illustrates just one possible permutation. A log-adder 510 is responsive to input signals $x_1$ 504 and $x_2$ 505 and computes an intermediate log-add sum $y_2$ 515. One example of a log-adder 510 is a max* operator. Another example of the log-adder 510 is an avg* operator. A log-adder 520 is responsive to the intermediate log-add sum $y_2$ 515 and an input signal $x_3$ 514 and computes an intermediate log-add sum $y_3$ 525. A log-adder 530 is responsive to the intermediate log-add sum $y_3$ 525 and an input signal $x_4$ 524 and computes an intermediate log-add sum $y_4$ 535. A log-adder 540 is responsive to the intermediate log-add sum $y_4$ 535 and an input signal $x_5$ 534 and computes an intermediate log-add sum $y_5$ 545. A log-adder 550 is responsive to the intermediate log-add sum $y_5$ 545 and an input signal $x_6$ 544 and computes an intermediate log-add sum $y_6$ 555. A log-adder 560 is responsive to the intermediate log-add sum $y_6$ 555 and an input signal $x_7$ 554 and computes an intermediate log-add sum $y_7$ 565. A log-adder 570 is responsive to the intermediate log-add sum $y_7$ 565 and an input signal $x_8$ 564 and computes a final log-add sum $y_8$ 575.

FIG. 6, numeral 600, provides an example diagram for a tree-like log-add addition of 8 input arguments (signals). The associative and commutative properties of the log-add function listed in Table 1 suggest that a large number of permutations exist among the input signals x and the intermediate results $z_1$. FIG. 6 illustrates just one possible permutation. The tree-like log-add representation can apply to log-MAP decoding as well as generating soft values. A log-adder 610 is responsive to input signals $x_1$ 601 and $x_2$ 602 and computes an intermediate log-add sum $z_1$ 615. One example of a log-adder 610 is a max* operator. Another example of the log-adder 610 is an avg* operator. A log-adder 620 is responsive to the input signals $x_3$ 603 and $x_4$ 604 and computes an intermediate log-add sum $z_2$ 625. A log-adder 630 is responsive to the input signals $x_5$ 605 and $x_6$ 606 and computes an intermediate log-add sum $z_3$ 635. A log-adder 640 is responsive to the input signals $x_7$ 607 and $x_8$ 608 and computes an intermediate log-add sum $z_4$ 645. A log-adder 650 is responsive to the intermediate log-add sums $z_1$ 615 and $z_2$ 625 and computes an intermediate log-add sum $z_5$ 655. A log-adder 660 is responsive to the intermediate log-add sums $z_3$ 635 and $z_4$ 645 and computes an intermediate log-add sum $z_6$ 665. A log-adder 670 is responsive to the intermediate log-add sums $z_5$ 655 and $z_6$ 665 and computes a final log-add sum $y_8$ 675.

FIG. 7, numeral 700, illustrates a block diagram of a baseband-equivalent model of a communication system 700. As shown in FIG. 7, an encoder 710 encodes an information sequence x(n) 705 to produce a vector of bits v(n) 715. A higher-order modulator 720 includes an operation of mapping the vector of bits v(n) 715 into a vector of complex symbols c(n) 725. One example of the mapping is grouping m bits into each symbol of the vector of complex symbols c(n) 725. For instance, for 8-PSK, three bits are mapped onto a point on a circle in a complex plane. The vector of complex symbols c(n) 725 is transmitted through a channel 730 that possibly corrupts the vector 725. One type of corruption is additive white Gaussian noise (AWGN). The output of the channel 730 is a vector of complex received symbols r(n) 735. A soft value generator 740 processes the vector of complex received symbols r(n) 735 to produce a vector of soft values y(n) 745. For example, each symbol (element) of the vector of received complex symbols r(n) 735 can produce m soft values. The soft value generator 740 is comprised of a plurality of bit soft value generators. An example of a bit soft value generator is shown in FIG. 9. The vector of soft values y(n) 745 is processed by a decoder 750 to produce an estimate of the information sequence b(n) 755.

FIG. 8, numeral 800, illustrates an example of a mapping for 8-PSK, a higher-order modulation. The notation (x,y,z) indicates a mapping of bits into a complex symbol of a constellation. For example, a bit sequence 1,1,1 is mapped into a complex symbol of $-1+j0$. The notation $s_k$ represents a distance measure from an element r 736 to the $k^{th}$ complex symbol. The term "element" refers to a member of the vector of received complex symbols r(n) 735. One example of a distance measure is squared Euclidean distance. The distance measure $s_0$ 801 is the distance from the element r 736 and the complex symbol associated with the bits (0,0,0). The distance measure $s_1$ 802 is the distance from the element r 736 and the complex symbol associated with the bits (0,0,1).

The distance measure $s_2$ 803 is the distance from the element r 736 and the complex symbol associated with the bits (0,1,0). The distance measure $s_3$ 804 is the distance from the element r 736 and the complex symbol associated with the bits (0,1,1). The distance measure $s_4$ 805 is the distance from the element r 736 and the complex symbol associated with the bits (1,0,0). The distance measure $s_5$ 806 is the distance from the element r 736 and the complex symbol associated with the bits (1,0,1). The distance measure $s_6$ 807 is the distance from the element r 736 and the complex symbol associated with the bits (1,1,0). The distance measure $s_7$ 808 is the distance from the element r 736 and the complex symbol associated with the bits (1,1,1).

FIG. 9, numeral 900, illustrates a block diagram for a bit soft value generator 900. FIG. 9 is an example implementation for the higher-order modulation shown in FIG. 8. The bit soft value generator 900, in this example, processes the distance measures 801, 802, 803, 804, 805, 805, 807, and 808 to generate a soft value for the most significant bit (MSB) when the higher-order modulation is 8-PSK. The bit soft value generator 900 uses tree-like log-adds. In FIG. 8, distance measures 801, 802, 803, and 804 correspond to an MSB equal to "0" while distance measures 805, 806, 807, and 808 correspond to an MSB equal to "1". A negator 990 is responsive to an input distance measure, for example 801, and negates the distance measure to produce a negative distance measure, for example 901. A log-adder 910 is responsive to negative distance measures 901 and 902 and produces an intermediate sum $z_1$ 915. An example of the log-adder 910 includes a log-add approximation that has a primary term and a parameterized correction factor. Similarly, a log-adder 920 is responsive to negative distance measures 903 and 904 and produces an intermediate sum $z_2$ 925. Likewise, a log-adder 930 is responsive to negative distance measures 905 and 906 and produces an intermediate sum $z_3$ 935. Similarly, a log-adder 940 is responsive to negative distance measures 907 and 908 and produces an intermediate sum $z_4$ 945. In the next stage of the tree, a log-adder 950 is responsive to the intermediate sums $z_1$ 915 and $z_2$ 925 and produces a log-add sum $z_5$ 955. Similarly, a log-adder 960 is responsive to the intermediate sums $z_3$ 935 and $z_4$ 945 and produces a log-add sum $z_6$ 965. A subtractor 970 computes the difference between the log-add sums $z_5$ 955 and $z_6$ 965 and produces an intermediate soft bit value 975. In a multiplier 980, a scale factor K 978 multiplies the intermediate soft bit value 975 to produce a soft bit value 985. The scale factor K 978 is defined in equation (11). Many permutations of FIG. 9 exist due to the log-add properties listed in Table 1. When K 978 is one, the multiplier 980 can be removed.

FIG. 10 is a graphical comparison of a dual-min method, a constant-log-MAP method, an avg* method (equation (14) with C=ln 2 and T=2×ln 2) and the optimal method for generating soft values. The higher-order modulations shown on the graph are 8-PSK, 16-QAM, 64-QAM, and 256-QAM. The number of bits per symbol for the higher-order modulations is 3, 4, 6, and 8 respectively. For this figure, a turbo decoder is used to simulate the performance of the different methods of generating soft values. The independent axis is signal-to-noise ratio (SNR), such as $E_b/N_o$, while the dependent axis is a frame-error-rate, which is a metric for evaluating decoder performance. The channel applies AWGN. The general trend in FIG. 10 is that as the number of bits per symbol increase, the dual-min method requires more SNR to produce the same performance as the optimal method. However, the avg* method performs as well as the optimal method even as the number of bits per symbol increase. The results also indicate that the application of the constant-log-MAP with parameters optimized for turbo decoding does not perform as well as it did for log-MAP turbo decoding.

While the foregoing described embodiments have been set forth above, it will be appreciated to one skilled in the art that the inventions described have applications beyond the described embodiments. Accordingly, it is intended that the scope of the invention including such alternatives, modifications, and variations contemplated shall be defined by the appended claims.

What is claimed is:

1. A method for a decoder to perform log domain maximum a posteriori (log-MAP) decoding, the method comprising the steps of:

generating a code graph;

processing information comprising a plurality of transformed probabilities;

manipulating the information for creating forward and backward recursions on the code graph;

combining the information and the forward and backward recursions for producing log-likelihood ratios on the code graph;

the manipulating and combining steps comprise a log-add kernel operation of computing a logarithm of a sum of a plurality of exponentiated input arguments; and representing the log-add kernel operation as a summation of an average of a plurality of the input arguments and a correction factor;

wherein the log-add kernel operation is represented by the summation of the average of the plurality of input arguments and a correction factor for a range of the plurality of input arguments, and is used by the decoder for decoding data.

2. A method as recited in claim 1, wherein the computing the correction factor comprises the steps of:

representing the correction factor as a summation of a constant and a Taylor series expansion; and truncating the Taylor series expansion to a finite number of terms.

3. A method as recited in claim 2, wherein the correction factor is a constant.

4. A method as recited in claim 3, wherein the constant is ln 2.

5. A method as recited in claim 2, wherein the computing the Taylor series expansion is modified to comprise the operations of additions, multiplications, and shifts on an information processor.

6. A method as recited in claim 1, wherein the log-add kernel operation is represented by a max operation outside of the range of the plurality of input arguments.

7. A log-domain maximum a posteriori (log-MAP) decoder, comprising:

a generator for producing a code graph;

a plurality of transformed probabilities;

an information processor for creating forward and backward recursions on the code graph;

a combiner responsive to said information processor and the plurality of transformed probabilities for producing log-likelihood ratios on the code graph;

a log-add kernel operation for the information processor and combiner for computing a logarithm of a sum of a plurality of exponentiated input arguments; and a representation of the log-add kernel operation as a summation of an average of a plurality of input arguments and a correction factor wherein said information processor computes a Taylor series expansion modified to comprise the operations of additions, multiplications, and shifts on said information processor.

8. A method for a decoder to perform a log-add of a plurality of input arguments in a communication system, the method comprising:

computing an average of the plurality of input arguments;

producing a sum from the average of the plurality of input arguments and a correction factor;

wherein the correction factor comprises the steps of:

representing the correction factor as a sum of a constant and a Taylor series expansion; and truncating the Taylor series expansion to a finite number of terms wherein the sum is used to compute a final log-likelihood ratio computation in the decoder.

9. A method as recited in claim 8, wherein the plurality of input arguments comprises a plurality of exponentiated input arguments.

10. A method as recited in claim 8, wherein the correction factor is a constant.

11. A method as recited in claim 10, wherein the constant is ln 2.

12. A method as recited in claim 8, wherein the Taylor series expansion is modified to comprise additions, multiplications, and shift operations.

13. A method as recited in claim 8, comprising creating a tree-like representation, and evaluating each node of the tree-like representation with respect to the plurality of input arguments.

14. A method of performing a kernel operation in a communication system, the method comprising:

receiving a plurality of symbols of a higher-order modulation;

generating bit soft values for the symbols of the higher-order modulation using a plurality of log-add operations;

inputting into each log-add operation a plurality of input arguments; and approximating each log-add operation with a primary term and a parameterized correction factor;

wherein the parameterized correction factor can be configured such that a log-add approximation is used for generating soft-values with a first set of parameters and for decoding with a second set of parameters.

15. The method of claim 14, wherein the primary term is a maximum of the plurality of input arguments.

16. The method of claim 14, wherein the primary term is an average of the plurality of input arguments.

17. The method of claim 14, wherein the parameterized correction factor is a linear function of the plurality of input arguments.

18. A method as recited in claim 14, wherein the parameterized correction factor is implemented with additions, multiplications, and shift operations.

* * * * *